(12) United States Patent
Cabe

(10) Patent No.: US 11,223,635 B2
(45) Date of Patent: Jan. 11, 2022

(54) INCEPTION OF SUSPICIOUS NETWORK TRAFFIC FOR ENHANCED NETWORK SECURITY

(71) Applicant: Fortinet, Inc., Sunnyvale, CA (US)

(72) Inventor: James Cabe, Houston, TX (US)

(73) Assignee: Fortinet, Inc., Sunnyvale, CA (US)

( * ) Notice: Subject to any disclaimer, the term of this patent is extended or adjusted under 35 U.S.C. 154(b) by 293 days.

(21) Appl. No.: 16/586,927

(22) Filed: Sep. 28, 2019

(65) Prior Publication Data

US 2021/0099468 A1 Apr. 1, 2021

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/0263* (2013.01); *H04L 63/145* (2013.01); *H04L 63/1425* (2013.01); *H04L 63/1433* (2013.01); *H04L 63/1466* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 7,540,025 B2 * | 5/2009 | Tzadikario | .......... | H04L 63/0227 726/22 |
| 10,880,270 B1 * | 12/2020 | Rigor | .................. | H04L 63/1425 |
| 2006/0107321 A1 * | 5/2006 | Tzadikario | .......... | H04L 63/0227 726/22 |
| 2017/0116416 A1 * | 4/2017 | Pearcy | .................. | G06F 21/552 |
| 2018/0054456 A1 * | 2/2018 | Ground | .............. | H04L 63/1433 |
| 2020/0213338 A1 * | 7/2020 | Lotem | .................... | G06N 5/046 |

OTHER PUBLICATIONS

Strom, Blake E., et al., "Finding Cyber Threats with ATT&CK-Based Analytics", MITRE, Jun. 2017, 53 pages.
Strom, Blake E. et al., "MITRE ATT&CK: Design and Philosophy", MITRE, Jul. 2018, 36 pages.

(Continued)

*Primary Examiner* — Joseph P Hirl
*Assistant Examiner* — Hassan Saadoun
(74) *Attorney, Agent, or Firm* — HDC Intellectual Property Law, LLP

(57) ABSTRACT

Systems and methods are described for inception of suspicious network traffic to allow detection of the beginning of common attacks by network security devices, such as NGFWs, UTM appliances and IPS appliances. According to one embodiment, inception engine running on network security appliance protecting a private network monitors a session between an external computing device and a server device associated with the private network. In response to receipt of suspicious traffic from external computing device indicative of an attack sequence, the inception engine blocks the suspicious traffic from reaching the server device and incepts the attack sequence by providing one or more responses to the external computing device, which are selected based on the attack sequence. Further, when the attack is confirmed, the inception engine diverts the traffic to a more capable deception device.

24 Claims, 8 Drawing Sheets

(56) References Cited

OTHER PUBLICATIONS

Nickels, Katie et al., "ATT&CKing the Status Quo: Improving Threat Intelligence and Cyber Defense with MITRE ATT&CK", MITRE, Aug. 7, 2018, 40 pages.
Nickels, Katie, et al., Turning Intelligence into Action with MITRE Att&CK, MITRE, 2019, 34 pages.
TrapX Security, "Active Defense: TrapX DeceptionGrid and Carbon Black Cb Response", www.trapx.com, 2018, 3 pages.
TrapX Security, "DeceptionGrid 6.3", www.trapx.com, 2018, 4 pages.
TrapX Security, "TrapX Deception Box", 2019, www.trapx.com, 2 pages.
TrapX Security, "CryptoTrap", www.trapx.com, 2016, 2 pages.

\* cited by examiner

INCEPTION OF SUSPICIOUS NETWORK TRAFFIC FOR ENHANCED NETWORK SECURITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2019, Fortinet, Inc.

BACKGROUND

Field

Embodiments of the present invention generally relate to network security. In particular, embodiments of the present invention relate to systems and methods to incept suspicious network traffic by a network security device by sending automated responses that appear to be from the target of the suspicious network traffic and if the behavior of the suspicious network traffic is indicative of the beginning of an attack, taking appropriate action, e.g., redirecting the attacker to a more capable network security device, such as a sandbox appliance, an Intrusion Prevention System (IPS), a network security device implementing full deception technology or the like.

Description of the Related Art

Several shortcomings prevail in the large and rapidly growing market for network security services. For example, both small and large enterprises fail to fully implement micro or macro segmentation schemes on their networks. This may be due to constraints relating to time, resources or ease of deployment, an inability to define role-based controls, maintenance of user authentication infrastructure and/or regulatory barriers. Therefore, technologies, which do not require full segmentation for detection of attacks within the network, continue to flourish in the market.

The most prominent examples of technologies that do not require full segmentation are deception, honeypot technology and wiretap machine-learning platforms. These technologies use behavioral analytics from an IPS, for example, to mitigate detected attacks, which have to be extracted from copied network traffic. Recently, cyber security devices based on deception have become popular. Deception based platforms attempt to mislead, delay or slow down an attack and seek to collect information to facilitate the capture of attackers. However, false positives are commonplace in such platforms and they tend to create noise on networks.

Firewalls date back to the early days of the Internet, when the ARPANET (Advanced Research Projects Agency Network) first implemented Transmission Control Protocol/Internet Protocol (TCP/IP), and have evolved over time. Firewall devices initially started out as packet filtering mechanisms and have now transformed into an essential element of network security. Next generation firewalls (NGFWs) are the third and the latest generation of firewall technology, which represents a combination of the traditional firewall concept with other network device filtering, scanning and inspection functionalities including application firewalling using in-line deep packet inspection (DPI), IPS functionality, encrypted traffic inspection, website filtering, Quality of Service (QoS)/bandwidth management, antivirus inspection and third-party identity management integration. Despite the significant improvements in firewall technology, there remains a large gap between existing firewall technology and currently available deception infrastructure.

SUMMARY

Systems and methods are described for inception of suspicious network traffic to allow detection of the beginning of common attacks by network security devices, such as NGFWs, UTM appliances and IPS appliances. According to one embodiment, an inception engine running on a first network security appliance protecting a private network, monitors a session between an external computing device and a server device associated with the private network. In response to receipt of suspicious traffic from the external computing device potentially indicative of an attack sequence of a plurality of known attack sequences being launched, the inception engine blocks the suspicious traffic from reaching the server device by cleansing the suspicious traffic and transmitting resulting cleansed traffic to the server device. The inception engine incepts the attack sequence by providing one or more responses to the external computing device that are selected based on the attack sequence. Further, one or more characteristics of the one or more responses are purposefully configured to give the impression that the attack sequence is having an effect associated with the attack sequence. Finally, in response to observing a threshold of additional suspicious traffic from the external computing device confirming the attack sequence, the inception engine redirects the external computing device to a second network security appliance associated with the private network.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
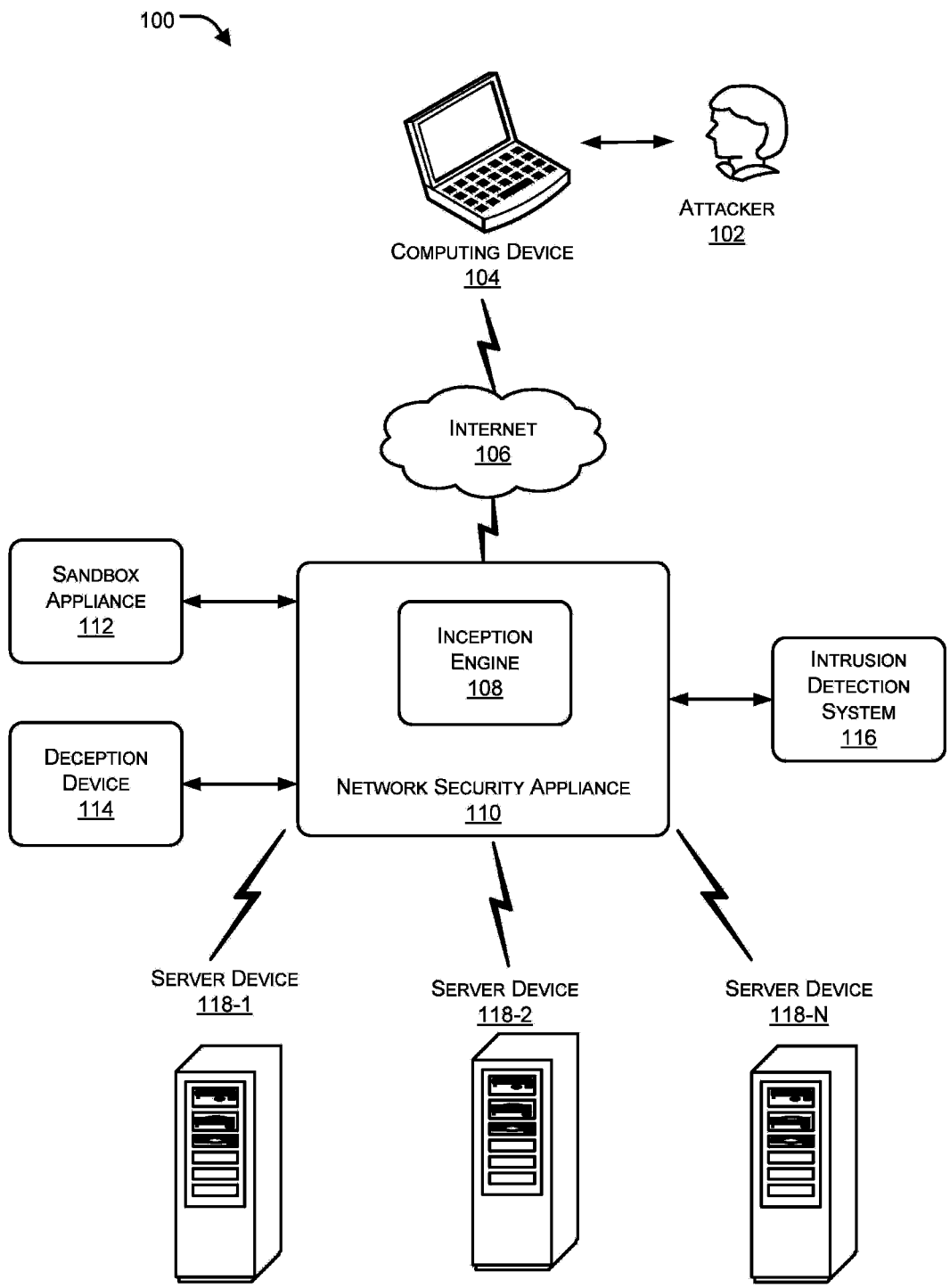
FIG. 1 represents an exemplary network architecture in which aspects of the present invention can be implemented in accordance with an embodiment of the present invention.

Systems and methods are described for inception of suspicious network traffic to allow detection of the beginning of common attacks by network security devices, such as NGFWs, UTM appliances and IPS appliances. According to one embodiment, the network security device employs empirical data indicative what techniques (e.g., adversarial behaviors or actions for interacting with specific platforms) are used by attackers in an attempt to accomplish specific tactics (e.g., the goals of the attacker, such as persisting within the private network, privilege escalation, discovery of information, credential access, moving laterally, execution (e.g., of adversary-controlled code), command and control, and/or exfiltrating data). For example, an If This, Then That (IFTTT) interaction model or an interaction model executed by a security orchestration platform can be implemented based on real-world observations (e.g., press reports, publicly-available government reports and/or reports form security vendors) of standard attacks to facilitate direct interaction with and sending of automated responses to a potential attacker to mimic or emulate a vulnerable target system. In this manner, the network security device incepts suspicious network traffic to identify the beginning of a recognized attack, thereby effectively performing false positive filtering prior to alerting the network administrator, blocking the traffic and/or redirecting the traffic to a deception device, a sandbox appliance, an IPS appliance or the like.

While for brevity only a limited number of specific inception scenarios are described herein, those skilled in the art will appreciate the techniques described herein are not limited to these specific examples and are broadly applicable to other inception scenarios relating to current or future attacks that are identifiable based on behavior demonstrated by a relatively small number of direct interactions with an external computer system controlled by an attacker or a compromised host, for example. A non-limiting source of information that may facilitate building of interaction models for such current and future attacks is MITRE ATT&CK™, a curated knowledge base and model for cyber adversary behavior.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

According to various embodiments of the present disclosure, an inception engine running on a first network security appliance protecting a private network, monitors a session between an external computing device and a server device associated with the private network. In response to receipt of suspicious traffic from the external computing device potentially, which indicates an attack sequence of a plurality of known attack sequences is being launched, the inception engine blocks the suspicious traffic from reaching the server device by cleansing the suspicious traffic and transmitting resulting cleansed traffic to the server device. The inception engine incepts the attack sequence by providing one or more responses to the external computing device that are selected based on the attack sequence. Further, one or more characteristics of the one or more responses are purposefully configured to give the impression that the attack sequence is having an effect associated with the attack sequence. In response to observing a threshold of additional suspicious traffic from the external computing device confirming the attack sequence, the inception engine redirects the external computing device to a second network security appliance associated with the private network.

Those skilled in the art will appreciate that the inception engine of the present disclosure responds directly to a suspicious or malicious computing device instead of allowing certain types of suspicious traffic to pass to other non-compromised servers or client devices of the network. As such, the suspicious computing device receives a response to query traffic (e.g., port scans, Christmas tree packets, intrusion traffic, and/or other suspicious behaviors), not from other servers or client devices of the network but initially only from the inception engine protecting the network (until and unless the inception engine hands off the traffic to another network security device). Therefore, the suspicious computing device may not realize that the inception engine is filtering/blocking the network traffic from reaching the intended devices of the network.

FIG. 1 represents an exemplary network architecture 100 in which aspects of the present invention can be implemented in accordance with an embodiment of the present invention. According to an embodiment, a technique is elaborated to incept suspicious network traffic by using an inception engine 108 that may be implemented in a network security appliance 110 protecting a private network. The private network (e.g., an enterprise network) may include multiple server devices 118-1, 118-2 . . . 118-N (which may be collectively referred to herein as server devices 118 and may be individually referred to herein as server device 118). In an implementation, inception engine 108 can be operatively coupled to a sandbox appliance 112, a deception device 114 and an intrusion detection system 116. In an alternate embodiment, sandbox appliance 112, deception device 114 and intrusion detection system 116 can be part of inception engine 108 or network security appliance 110.

In an embodiment, an attacker 102 can interact with server devices 118, and client devices associated with server devices 118, using his/her computing device 104 through Internet 106 (which is interchangeably referred to as network 106 hereinafter). Client devices (not shown) associated with server device 118 may include, but are not limited to, personal computers, smart devices, web-enabled devices, hand-held devices, laptops, mobile phones and the like, to enable interaction with the network 106.

Those skilled in the art will appreciate that, network 106 can be wireless network, wired network or a combination thereof that can be implemented as one of the different types of networks, such as Intranet, Local Area Network (LAN), Wide Area Network (WAN), Internet, and the like. Further, network 108 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, inception engine 108 can be used for pre-qualifying network traffic to determine whether it represents an attempt to attack the private network (e.g., server devices 118 or associated client devices). For example, the network traffic from attacker computing device 104 can be scanned and checked for indications of a possible attack based on an attack sequence by attacker computing device 104. If the network traffic from attacker computing device 104 appears to be the beginning of a possible attack, the inception engine 108 may incept the attack to further draw out the attacker's intentions. If and when the possible attack is confirmed as an actual attack, the network traffic can be directed to other more capable network security device, such as sandbox appliance 112, an Intrusion Prevention System (IPS) or a network security device implementing full deception technology such as deception device 114.

In an embodiment, inception engine 108 can be implemented on network security appliance 110 such as a firewall device, a next-generation firewall device, an intrusion prevention system, an intrusion detection system or a unified threat management device to monitor all sessions between attacker computing device 104 and server devices 118. Further, server devices 118 can include a Domain Name System (DNS) server, a Simple Mail Transfer Protocol (SMTP) server, a Simple Network Management Protocol (SNMP) server or a file server.

When inception engine 108 receives suspicious traffic from attacker computing device 104, which is indicative of a possible attack sequence of plurality of known attack sequences, inception engine 108 blocks the suspicious network traffic from reaching intended server device 118 by cleansing the suspicious network traffic and transmitting resulting cleansed traffic to server device 118. The suspicious network traffic can include a Christmas tree packet, a packet having a time-to-live (TTL) value greater than a predefined or configurable threshold. Additionally or alternatively, the suspicious network traffic can further include a network discovery mapping, an SMTP attack, an SNMP exploit and the like.

According to an embodiment, inception engine 108 can be informed regarding receipt of suspicious network traffic by intrusion detection system 116, which can include attack library including records of various attack sequences that can be used for detecting a possible attack by attacker computing device 104. The attack sequence can be incepted by inception engine 108 by providing responses such as junk data to attacker computing device 104 to give an appearance of server device 118 being busy, for example. The responses being transmitted to attacker computing device 104 can be selected based on the attack sequence being deployed by attacker computing device 104 and can be selected from a library of pre-defined responses, via an IFTTT based response platform, or a security orchestration platform. Characteristics of the responses can be purposefully configured to give an impression that the attack sequence by the attacker computing device 104 is having an effect associated with the attack sequence. For example, the characteristics can include a Transmission Control Protocol (TCP) acknowledgement frame containing an indication that the TCP window size for the DNS server is 0 and a delayed User Datagram Protocol (UDP) response packet to give an appearance of the server computing device 118 being busy.

When a threshold of additional suspicious network traffic from attacker computing device 104 is observed, which confirms the attack sequence, inception engine 108 redirects the additional suspicious network traffic to another network security appliance associated with the private network thereby averting a possible attack on the server device 118. For example, the suspicious traffic can be redirected by inception engine 108 to sandbox appliance 112 and/or deception device 114.

According to an exemplary implementation, when a specific set of behavior is detected, a learning policy executed on the inception engine 108 may allow content inspection and proxy only cleaned traffic to server devices 118 and associated client devices. Thus, cleansed traffic may reach the server devices 118 and associated client devices, at the same time the inception engine 108 may incept traffic like Christmas tree packets, port scanning, peer-to-peer content pushes that are not (pre)authenticated, direct copy processes, DNS poisoning, DNS reflections, and the like. The inception engine 106 may respond to the attacker computing device 104 directly using a predefined set of rules, and responsive to confirmation of the attack, redirect the traffic to a deception platform (e.g., deception device 114).

Figure 2:
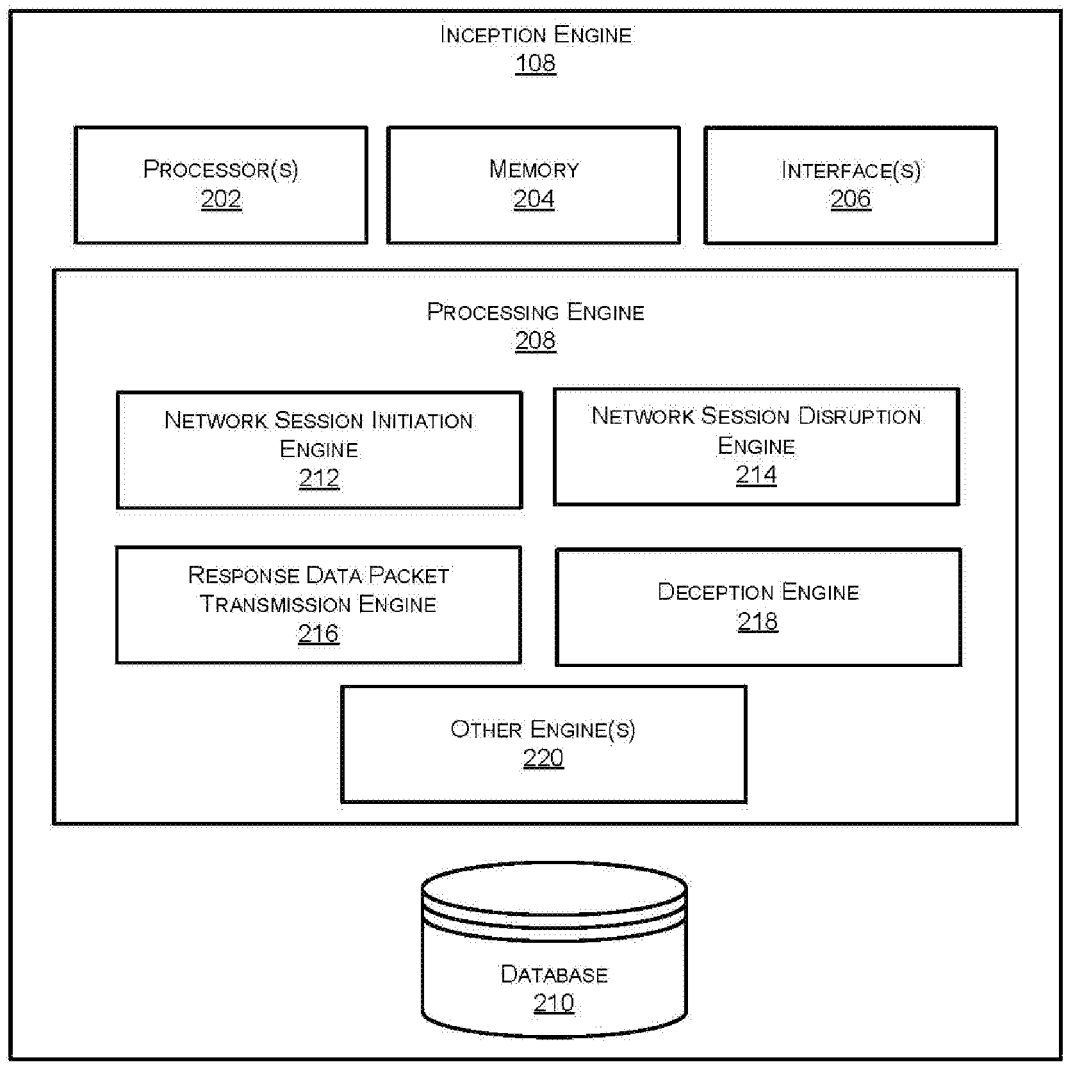
FIG. 2 is a block diagram illustrating exemplary functional components of an inception engine in accordance with an embodiment of the present invention.

FIG. 2 is a block diagram illustrating exemplary functional components of an inception engine 108 in accordance with an embodiment of the present invention. As illustrated, inception engine 108 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of inception engine 108. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Inception engine 108 can also include one or more interface(s) 206. Interface(s) 206 may include a variety of interfaces, for example, interfaces for data input and output devices, referred to as I/O devices, storage devices, and the like. Interface(s) 206 may facilitate communication of inception engine 108 with various devices coupled to inception engine 108. Interface(s) 206 may also provide a communication pathway for one or more components of inception engine 108. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, inception engine 108 can include the machine-readable storage medium storing the instructions and the processing resource to execute the instructions, or the machine-readable storage medium may be separate but accessible to inception engine 108 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a network session initiation engine 212, a network session disruption engine 214, a response data packet transmission engine 216, a deception engine 218 and other engine(s) 220. Other engine(s) 220 can implement functionalities that supplement applications or functions performed by inception engine 108 or processing engine(s) 208.

In an embodiment, network session initiation engine 212 receives network traffic from an external computing device to connect to a server device within the protected network. Based on receipt of the network traffic, network session initiation engine 212 initiates a network session between the external computing device and the server device and further monitors the initiated network session for possible suspicious traffic.

In an embodiment, network session disruption engine 214 can be used for providing a disruption to the network session. When suspicious network traffic is received from the external computing device, which indicates possible attack sequence of plurality of known attack sequences, network session disruption engine 214 can block the suspicious network traffic from reaching the server device by cleansing the suspicious network traffic and transmitting the resulting cleansed traffic to the server device. Non-limiting examples of suspicious network traffic include a Christmas tree packet, a packet having a TTL value greater than a predefined or configurable threshold, a network discovery mapping, an SMTP attack, or an SNMP exploit.

In an embodiment, the attack sequence can be incepted by providing one or more data canned responses to the attacker. For example, the responses may include junk data to the external computing device, provided by response data packet transmission engine 216, to give the appearance of the server device being busy, for example, or otherwise being affected by the attack. The responses being transmitted to the external computing device can be selected based on the identified attack sequence being received from the external computing device. For example, suitable responses can be selected from a library of pre-defined responses, via an IFTTT based response platform, or a security orchestration platform. Characteristics of the responses can be purposefully configured to give the impression that the attack sequence by external computing device is having the desired effect of the attacker that is associated with the attack sequence. These characteristics can include a TCP acknowledgement frame containing an indication that the TCP window size for the DNS server is 0 and a delayed User Datagram Protocol (UDP) response packet to give an appearance of the server device being busy.

In an embodiment, since the inception engine 108 is going along with the potential attack and giving the appearance that the server is being impacted, for example, the external computing device may transmit additional suspicious network traffic. When additional suspicious network traffic meeting a predefined or configurable threshold of condition is observed from the attacker computing device 104, which confirms a particular known attack sequence, inception engine 108 may redirect the additional suspicious network traffic to another network security appliance associated with the private network thereby prequalifying the attack on behalf of the subsequent network security device and averting a possible attack on the server device.

Those skilled in the art will appreciate that although various embodiments of the present disclosure are explained with reference to specific attack sequences from an external network device on a server and/or client device of a private network, the techniques described herein are not limited to these specific examples and are broadly applicable to other inception scenarios relating to current or future attacks, for example, attacks from a first computing device to a server and/or a second computing device that are part of a private network protected by a firewall implementing the inception engine 108.

FIGS. 3A-H illustrate exemplary interactions among various computing devices and a firewall implementing the inception engine in accordance with an embodiment of the present invention.

Figure 3A:
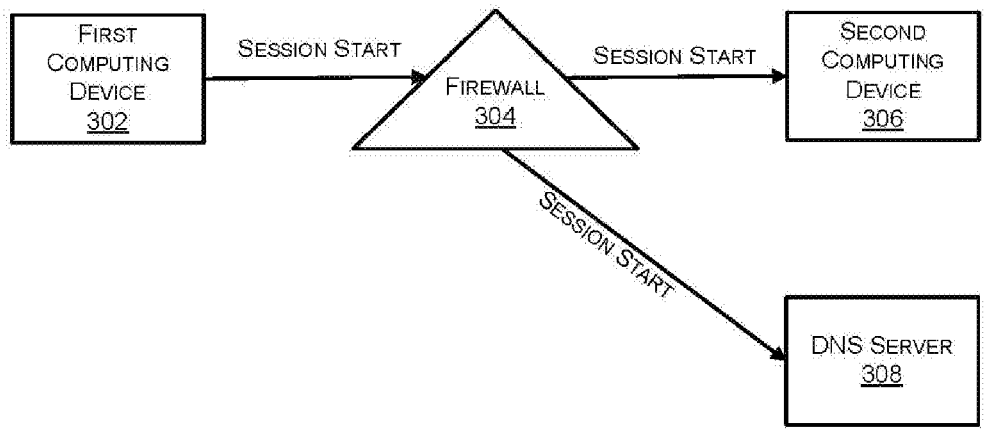
FIGS. 3A-H illustrate exemplary interactions among various computing devices and a firewall implementing the inception engine in accordance with an embodiment of the present invention.

FIG. 3A illustrates an exemplary interaction representing initiation of a session with a first computing device 302 and a second computing device 306 in accordance with an embodiment of the present invention. In the context of the present example, first computing device 302 can initiate a connection through a request by transmitting network traffic pertaining to a query to DNS server 308 via firewall 304. DNS server 308 in response to receipt of the query resolves or provides the address of a second computing device 306 to firewall 304. In response to receipt of the address of second computing device 306 by firewall, a session can be created between first computing device 302, second computing device 306 and DNS server 308.

Figure 3B:
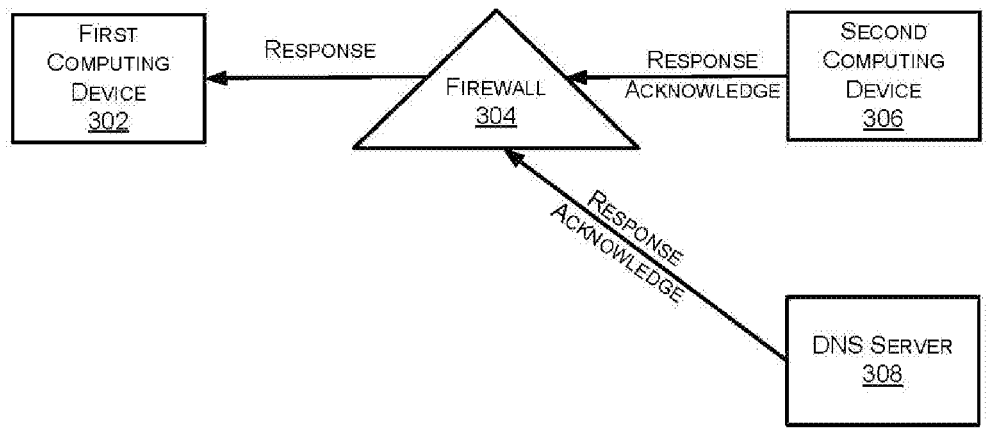

FIG. 3B illustrates an exemplary interaction representing a response from DNS server 308 and second computing device 306 in accordance with an embodiment of the present disclosure. In the context of the present example, in response to receipt of the session start request by first computing device 302, second computing device 306 and DNS server can transmit an acknowledgement to first computing device 302 indicating that the session start request has been received and the initiated/started session is set for communication.

Figure 3C:
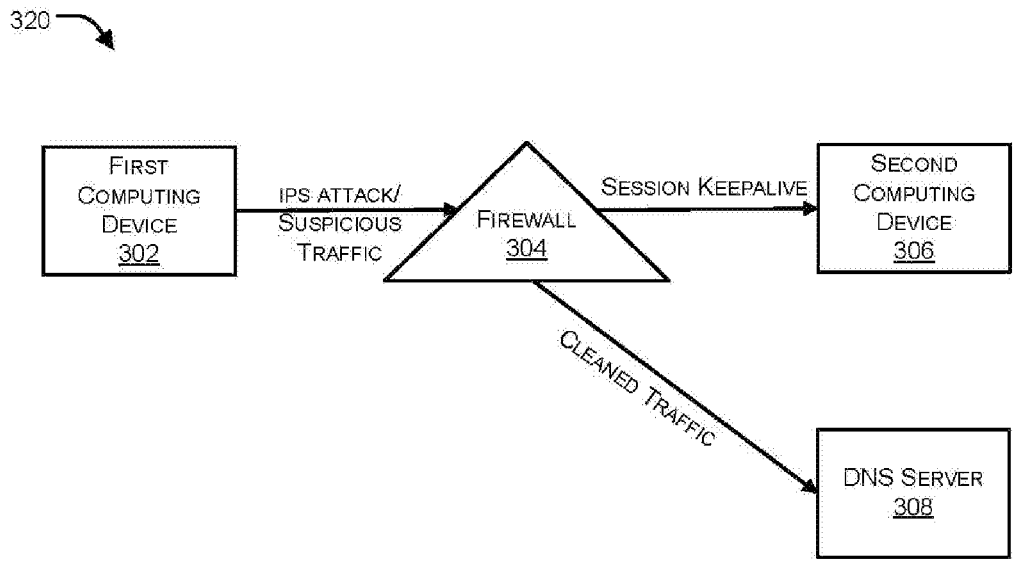

FIG. 3C illustrates an exemplary interaction representing a possible IPS attack or suspicious network traffic from first computing device 302 in accordance with an embodiment of the present disclosure. In the context of the present example, first computing device 302 transmits suspicious network traffic/IPS attack to second computing device 306 and/or DNS server 308. The received IPS attack/suspicious network traffic can be blocked by firewall 304, and session keep alive signal can be sent to second computing device 306. The received IPS attack/suspicious network traffic can be cleansed before being sent to DNS server 308.

Figure 3D:
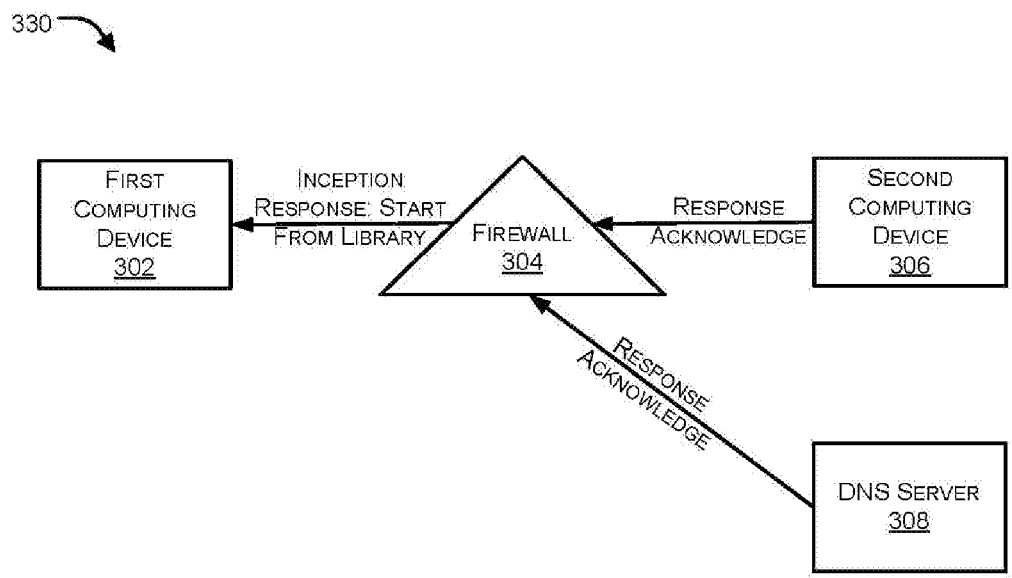

FIG. 3D illustrates an exemplary interaction representing inception of the attack by firewall 304 in accordance with an embodiment of the present disclosure. In the context of the present example, in response to receipt of suspicious network traffic/IPS attack a response acknowledgment can be sent to first computing device 302. The acknowledgement can include providing one or more predefined responses to first computing device 302 from a library of responses, for example, based on the attack sequence observed from the first computing device 302.

Figure 3E:
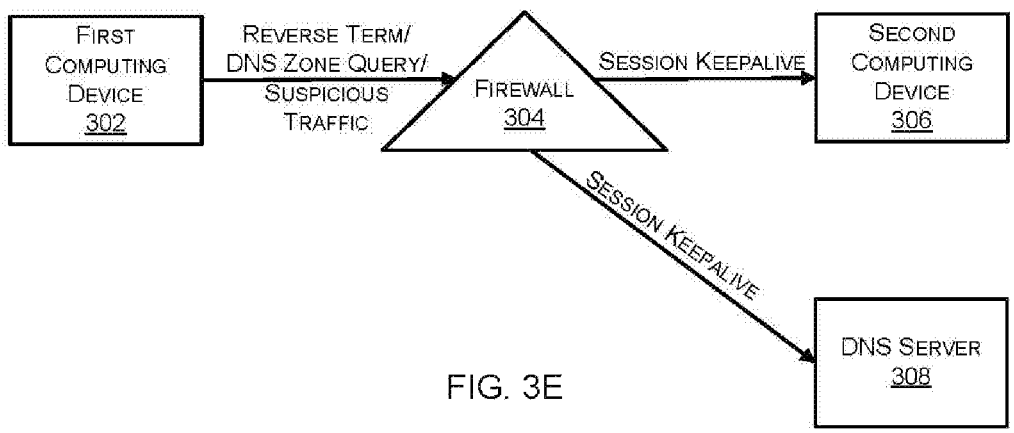

FIG. 3E illustrates an exemplary interaction representing transmission of suspicious traffic to DNS server 308 and/or second computing device 306 in accordance with an embodiment of the present disclosure. In the context of the present example, first computing device 302 continues to transmit suspicious traffic to DNS server 308 and/or second computing device 306. In response to receipt of the suspicious traffic, firewall 304 goes along with the attack sequence to incept the attack, and blocks the suspicious network traffic by cleansing the suspicions network traffic and transmitting the cleansed network traffic to DNS server 308 and/or second computing device 306.

Figure 3F:
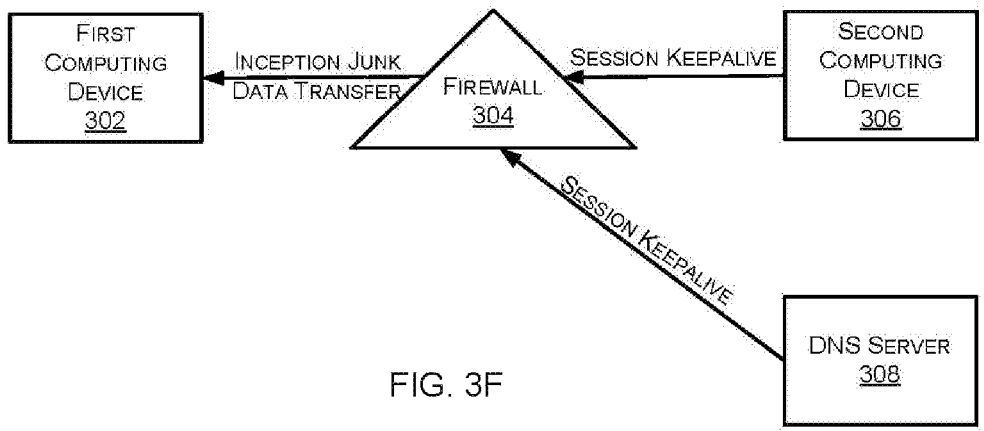

FIG. 3F illustrates an exemplary interaction representing junk data being transmitted to first computing device 302 in accordance with an embodiment of the present disclosure. In the context of the present example, firewall 304 incepts the attack sequence by providing suitable responses to first computing device. The responses are selected based on the attack sequence and can be configured so as to give an impression to first computing device 302 that the attack sequence is having an effect associated with the attack sequence. For example, the responses can have characteristics to give an appearance that DNS server 308 is busy.

Figure 3G:
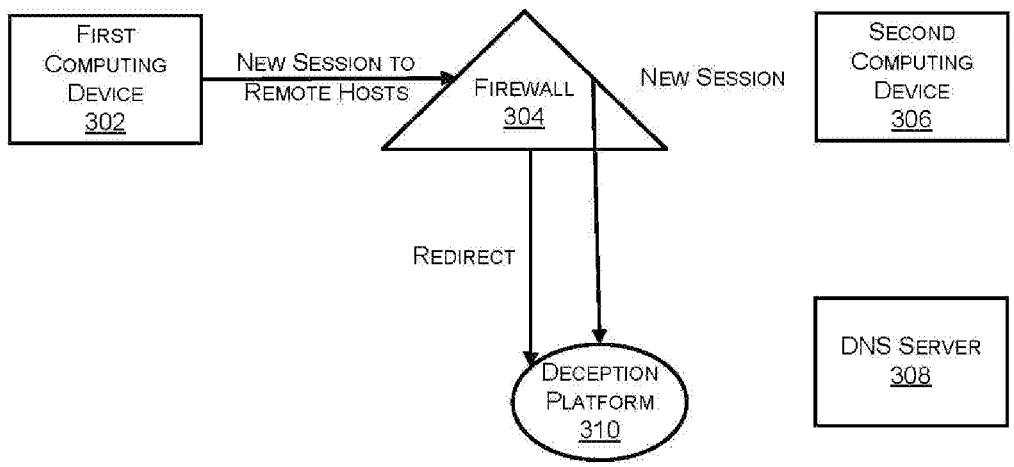

FIG. 3G illustrates an exemplary interaction representation of redirecting the network traffic to deception platform 310 in accordance with an embodiment of the present disclosure. In the context of the present example, when DNS server 308 seems busy, first computing device 302 may transmit additional suspicious network traffic to firewall 304. At this point, the additional suspicious network traffic may be sufficient to confirm the attack sequence by meeting a predetermined or configurable threshold and/or meeting one of more conditions associated with the known attack sequence. On confirmation of the attack sequence, firewall 304 redirects the additional suspicious network traffic to deception platform 310, thereby averting a possible attack on DNS server 308 and/or second computing device 306. In alternative embodiments, firewall 304 may redirect the first computing device 302 to another network security device (e.g., a sandbox appliance or an intrusion detection system) associated with the protected network.

Figure 3H:
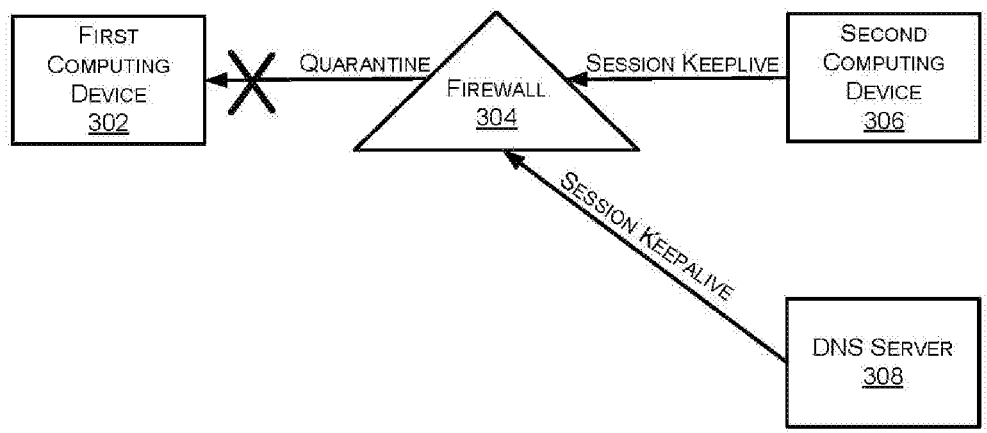

FIG. 3H illustrates an exemplary interaction representing quarantine of attack in accordance with an embodiment of the present disclosure. In the context of the present example, responsive to confirmation of the attack sequence, firewall 304 can quarantine the first computing device 302 to separate and restrict the suspicious traffic. While various examples described herein make use of an IFTTT interaction model or an interaction model executed by a security orchestration platform, those skilled in the art will appreciate that the present invention can enable use of machine learning and artificial neural networks to generate the automated responses to incept potential attacks.

Figure 4:
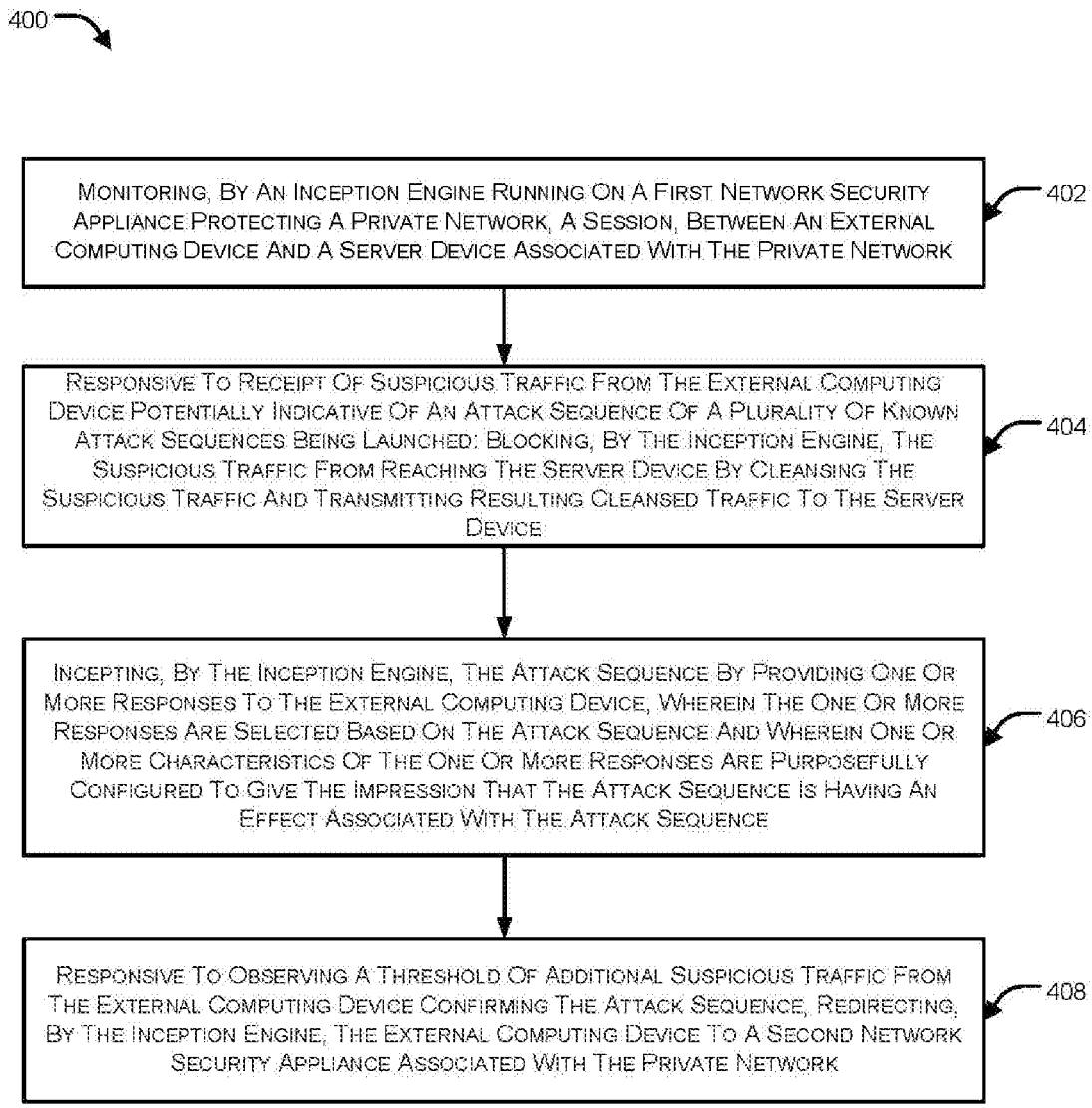
FIG. 4 is a flow diagram illustrating a process to incept suspicious network traffic in accordance with an embodiment of the present invention.

FIG. 4 is a flow diagram 400 illustrating a process to incept suspicious network traffic in accordance with an embodiment of the present invention. In the context of the present example, block 402 pertains to monitoring of a session, between an external computing device and a server device associated with a private network by an inception engine running on a first network security appliance protecting the private network.

When suspicious traffic from the external computing device is received by the inception engine, which potentially indicates an attack sequence of a plurality of known attack sequences, at block 404, the inception engine blocks the suspicious traffic from reaching the server device by cleansing the suspicious traffic and transmitting resulting cleansed traffic to the server device.

In an embodiment, at block 406 the inception engine incepts the attack sequence by providing one or more responses to the external computing device, which are selected based on the attack sequence such that one or more characteristics of the one or more responses are purposefully configured to give an impression that the attack sequence is having an effect associated with the attack sequence.

Further, in response to observing a threshold of additional suspicious traffic from the external computing device, which confirms the attack sequence, at block 408, the inception engine redirects the external computing device to a second network security appliance associated with the private network.

Figure 5:
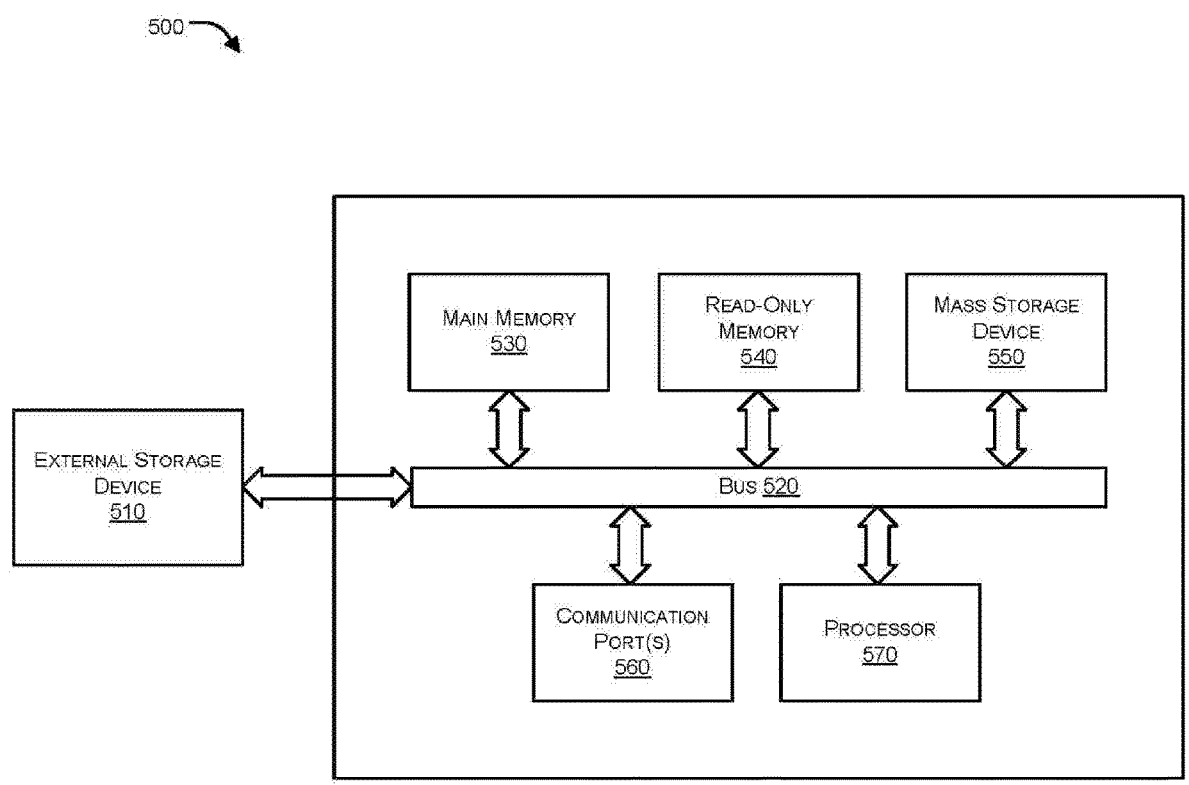
FIG. 5 illustrates an exemplary computer system in which or with which embodiments of the present invention may be utilized.

FIG. 5 illustrates an exemplary computer system 500 in which or with which embodiments of the present invention may be utilized. As shown in FIG. 5, computer system 500 includes an external storage device 510, a bus 520, a main memory 530, a read only memory 540, a mass storage device 550, a communication port 560, and a processor 570. Computer system may represent some portion of inception engine 108 or network security appliance 110.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem-based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   monitoring, by an inception engine running on a first network security appliance protecting a private network, a session, between an external computing device and a server device associated with the private network; and
   responsive to receipt of suspicious traffic from the external computing device potentially indicative of an attack sequence of a plurality of known attack sequences being launched:
      blocking, by the inception engine, the suspicious traffic from reaching the server device by cleansing the suspicious traffic and transmitting resulting cleansed traffic to the server device;
      incepting, by the inception engine, the attack sequence by providing one or more responses to the external computing device, wherein the one or more responses are selected based on the attack sequence and wherein one or more characteristics of the one or more responses are purposefully configured to give the impression that the attack sequence is having an effect associated with the attack sequence; and
      responsive to observing a threshold of additional suspicious traffic from the external computing device confirming the attack sequence, redirecting, by the inception engine, the external computing device to a second network security appliance associated with the private network.

2. The method of claim 1, wherein the one or more responses include junk data being returned to the external computing device.

3. The method of claim 1, wherein the inception engine is informed regarding the receipt of suspicious network traffic by an intrusion detection system associated with the private network.

4. The method of claim 1, wherein the inception engine detects the receipt of suspicious network traffic.

5. The method of claim 1, wherein the server device comprises a Simple Mail Transfer Protocol (SMTP) server, a Simple Network Management Protocol (SNMP) server or a file server.

6. The method of claim 1, wherein the suspicious network traffic comprises a Christmas tree packet, a packet having a time-to-live (TTL) value greater than a predefined or configurable threshold, a network discovery mapping, an SMTP attack, or an SNMP exploit.

7. The method of claim 1, wherein the one or more responses are selected from a library of pre-defined responses, via an If This, Then That (IFTTT) based response platform, or a security orchestration platform.

8. The method of claim 1, wherein the first network security device comprises a firewall device, a next-generation firewall device, an intrusion prevention system, an intrusion detection system or a unified threat management device.

9. The method of claim 1, wherein the server device comprises a Domain Name System (DNS) server.

10. The method of claim 9, wherein the one or more characteristics give an appearance of the DNS server being busy.

11. The method of claim 10, wherein the one or more characteristics comprise a Transmission Control Protocol (TCP) acknowledgement frame containing an indication that the TCP window size for the DNS server is 0.

12. The method of claim 10, wherein the one or more characteristics comprise a delayed User Datagram Protocol (UDP) response packet.

13. A non-transitory computer-readable storage medium embodying a set of instructions, which when executed by one or more processors of a first network security appliance protecting a private network, causes the one or more processors to perform a method comprising:
monitoring, by an inception engine running on the first network security appliance, a session, between an external computing device and a server device associated with the private network; and
responsive to receipt of suspicious traffic from the external computing device potentially indicative of an attack sequence of a plurality of known attack sequences being launched:
blocking, by the inception engine, the suspicious traffic from reaching the server device by cleansing the suspicious traffic and transmitting resulting cleansed traffic to the server device;
incepting, by the inception engine, the attack sequence by providing one or more responses to the external computing device, wherein the one or more responses are selected based on the attack sequence and wherein one or more characteristics of the one or more responses are purposefully configured to give the impression that the attack sequence is having an effect associated with the attack sequence; and
responsive to observing a threshold of additional suspicious traffic from the external computing device confirming the attack sequence, redirecting, by the inception engine, the external computing device to a second network security appliance associated with the private network.

14. The non-transitory computer-readable storage medium claim 13, wherein the one or more responses include junk data being returned to the external computing device.

15. The non-transitory computer-readable storage medium claim 13, wherein the inception engine is informed regarding the receipt of suspicious network traffic by an intrusion detection system associated with the private network.

16. The non-transitory computer-readable storage medium claim 13, wherein the inception engine detects the receipt of suspicious network traffic.

17. The non-transitory computer-readable storage medium claim 13, wherein the server device comprises a Simple Mail Transfer Protocol (SMTP) server, a Simple Network Management Protocol (SNMP) server or a file server.

18. The non-transitory computer-readable storage medium claim 13, wherein the suspicious network traffic comprises a Christmas tree packet, a packet having a time-to-live (TTL) value greater than a predefined or configurable threshold, a network discovery mapping, an SMTP attack, or an SNMP exploit.

19. The non-transitory computer-readable storage medium claim 13, wherein the one or more responses are selected from a library of pre-defined responses, via an If This, Then That (IFTTT) based response platform, or a security orchestration platform.

20. The non-transitory computer-readable storage medium claim 13, wherein the first network security device comprises a firewall device, a next-generation firewall device, an intrusion prevention system, an intrusion detection system or a unified threat management device.

21. The non-transitory computer-readable storage medium claim 13, wherein the server device comprises a Domain Name System (DNS) server.

22. The non-transitory computer-readable storage medium claim 21, wherein the one or more characteristics give an appearance of the DNS server being busy.

23. The non-transitory computer-readable storage medium claim 22, wherein the one or more characteristics comprise a Transmission Control Protocol (TCP) acknowledgement frame containing an indication that the TCP window size for the DNS server is 0.

24. The non-transitory computer-readable storage medium claim 22, wherein the one or more characteristics comprise a delayed User Datagram Protocol (UDP) response packet.

* * * * *